United States Patent
Patton et al.

(10) Patent No.: US 7,114,176 B2
(45) Date of Patent: Sep. 26, 2006

(54) TAKING OWNERSHIP OF A PART-PHYSICAL, PART-VIRTUAL DEVICE

(75) Inventors: Charles M. Patton, Eugene, OR (US); Stephen A Loughran, Corvallis, OR (US); Rajeev K. Pandey, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1047 days.

(21) Appl. No.: 10/029,070

(22) Filed: Dec. 21, 2001

(65) Prior Publication Data

US 2003/0120921 A1   Jun. 26, 2003

(51) Int. Cl.
*G06F 15/16* (2006.01)
*H04L 9/32* (2006.01)

(52) U.S. Cl. .......................... 726/4; 713/182
(58) Field of Classification Search .......... 726/2, 726/4, 5, 9, 10; 713/182, 184, 185; 705/18, 705/64; 380/255, 258
See application file for complete search history.

(56) References Cited

U.S. PATENT DOCUMENTS 6,243,468 B1 * 6/2001 Pearce et al. ............... 380/255
6,243,469 B1   6/2001 Kataoka et al. ............. 380/255
6,351,817 B1   2/2002 Flyntz ........................ 713/202

OTHER PUBLICATIONS http://www-1ce.eng.cam.ac.uk/_fms27/duckling/; "The Resurrecting Duckling: Security Issues For Ad-Hoc Wireless Networks"; by: Frank Stajano & Ross Anderson; Mar. 22, 2001.
http://www.e-speak.net/; "Welcome To E-Speak—What is E-Speak"; Apr. 2, 2001.
http://www.e-speak.hp.com/; "E-Speak"; Apr. 2, 2001.

* cited by examiner

*Primary Examiner*—Justin T. Darrow (57) ABSTRACT

The present invention provides a method, system and device for securing ownership for a two-part device with a physical unit and a virtual unit so that ownership of the two-part device is efficiently initiated, maintained, and transferred. The steps include initiating, by a user, an activation signal from the physical unit to the virtual unit to activate an ownership procedure and employing a double safety mechanism to activate ownership services via the virtual unit for the physical unit.

52 Claims, 6 Drawing Sheets

TAKING OWNERSHIP OF A PART-PHYSICAL, PART-VIRTUAL DEVICE

CROSS REFERENCE TO RELATED APPLICATIONS

The present invention is related to U.S. patent application Ser. No. 10/029,338, filed on Dec. 21, 2001 and Ser. No. 10/028,808, filed on Dec. 21, 2001 by the same inventors, Charles M. Patton, Stephen A. Loughran, and Rajeev K. Pandey, being filed contemporaneously with the present application.

FIELD OF THE INVENTION

The invention relates generally to producing appliances wrapped in services, or more particularly, to ownership linking of a hardware device and a remotely located software file.

BACKGROUND OF THE INVENTION

In the past it was common to simply purchase an electronics device, take it home and use it as it was. Inside the package there was typically a registration form, on which the owner was usually encouraged to register his ownership with the manufacturer. This activity was a voluntary measure that the owner could perform, but it was not generally required. If assistance with the device was needed at a later date, the manufacturer usually asked the purchaser to identify the device by looking in a particular location on the device and reading off its own particular ID and then proceeded to give the purchaser the assistance needed.

In contrast, particularly if a purchaser makes a software purchase at an Internet site, takes ownership of a virtual device such as a personal web site, email account or even software he has bought and has possession of, the owner-to-be may be required to go through a registration process. Such a process almost inevitably ties the owner permanently to the virtual device. Thus, when the software or the like is transferred to another owner, the transfer of ownership is not as simple as the transfer of ownership of a physical device. In some cases, the new owner may not be able to obtain a transfer of registration.

However, as more devices are being developed that utilize more and more remotely located software, there is a need for devices that have physical and remote virtual components that are linked together with greater permanence. Thus, there is a need for a two-part device with a physical unit and a virtual unit, wherein ownership of the two-part device can readily be initiated, maintained, and transferred.

SUMMARY OF THE INVENTION

The present invention provides a method, device and system for securing ownership for a two-part device with a physical unit and a virtual unit such that ownership of the two-part device is efficiently initiated, maintained, and transferred. The method includes the steps of initiating, by a user, an activation signal from the physical unit to the virtual unit to activate an ownership procedure and employing a double safety mechanism to activate ownership services via the virtual unit for the physical unit.

BRIEF DESCRIPTION OF THE DRAWINGS

The foregoing advantages and features of the invention will become apparent upon reference to the following detailed description and the accompanying drawings, of which.

DETAILED DESCRIPTION OF THE PREFERRED EMBODIMENT

The invention allows a user to obtain ownership rights and privileges for a physical unit, such as for example, a printer, and a substantially permanently associated virtual unit, such as for example, an email account. A double safety mechanism allows the system to verify the authenticity of the user, for example, by communicating over the Internet. This efficient system provides a user with a convenient manner of recording ownership and, where desired, transferring ownership of a physical device that is associated with a virtual unit.

Figure 1:
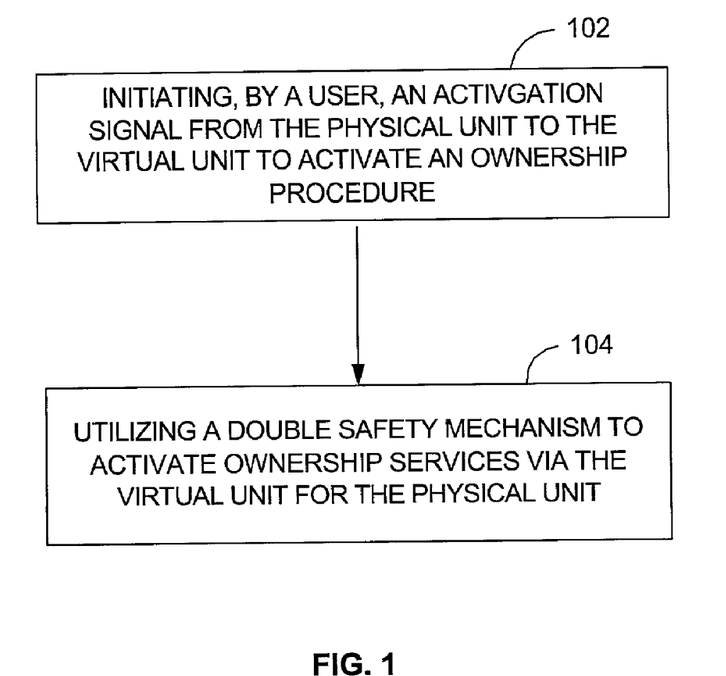
FIG. 1 is a flow chart of one embodiment of steps in accordance with a method of the present invention.

Thus, the present invention provides a method, system and device for securing ownership for a two-part device with a physical unit and a virtual unit such that ownership of the two-part device may be efficiently initiated, maintained, and transferred. Typically, as shown in FIG. 1, the user initiates 102 an activation signal from the physical unit to the virtual unit to activate an ownership procedure and then utilizes 104 a double safety mechanism to activate ownership services via the virtual unit for the physical unit. The virtual unit may be a virtual device hosting entity that may be, for example, an Internet Data Center, an e-Services Host, a Control Console, or a Secure Data Storage Unit. Where desired, a web browser may be used as a Control Console. The Secure Data Storage Unit is generally a memory controllable by the user, and may, for example, be a physical device under control of the user or a virtual device under control of the user.

Figure 2:
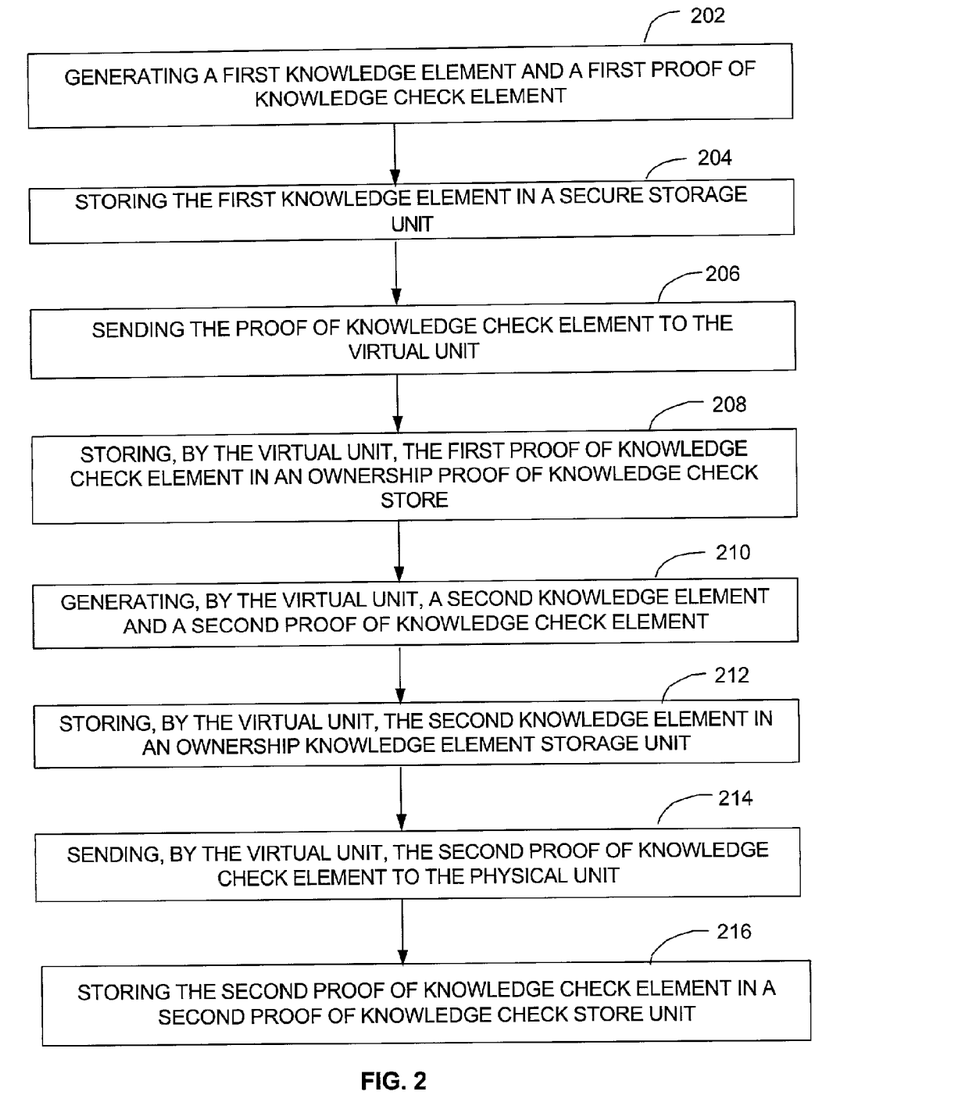
FIG. 2 is a flow chart of one embodiment of steps for implementing a double safety mechanism in accordance with the present invention.

As shown in FIG. 2, in one embodiment, the double safety mechanism may be a process that includes the steps of, upon the virtual unit upon being activated, generating 202 a first Knowledge Element and a first Proof of Knowledge Check Element and then storing 204 the first Knowledge Element in a Secure Storage Unit and sending 206 the Proof of Knowledge Check Element to the virtual unit. Next, upon the virtual unit receiving the Proof of Knowledge Check Element, the method includes storing 208, by the virtual unit the first Proof of Knowledge Check Element in an Ownership Proof of Knowledge Check Store and generating 210, by the virtual unit, a second Knowledge Element and a second Proof of Knowledge Check Element followed by storing 212, by the virtual unit, the second Knowledge Element in an Ownership Knowledge Element Storage Unit. Then, the virtual unit sends 214 the second Proof of Knowledge Check Element to the physical unit and the second Proof of Knowledge Check Element is stored 216 in a second Proof of Knowledge Check Store unit. In one embodiment, the first Knowledge Element and the first Proof of Knowledge Check Element may be generated by the physical unit. Alternatively, generating the first Knowledge Element and the first Proof of Knowledge Check Element may be accomplished by a Control Console that is coupled to the virtual unit, the physical unit and to a Secure Data Storage Unit. The physical unit may store the second Proof of Knowledge Check Element in a second Proof of Knowledge Check Store unit by storing in a memory of the physical unit, or alternatively, a Control Console may be used to store the second Proof of Knowledge Check Element in a second Proof of Knowledge Check Store unit in a Secure Data Storage unit. When an activation signal is initiated from the physical unit to virtual unit in order to activate an ownership procedure, such initiation may include using an Internet address or a uniform resource identifier recorded in the physical unit to send the activation signal.

Figure 3:
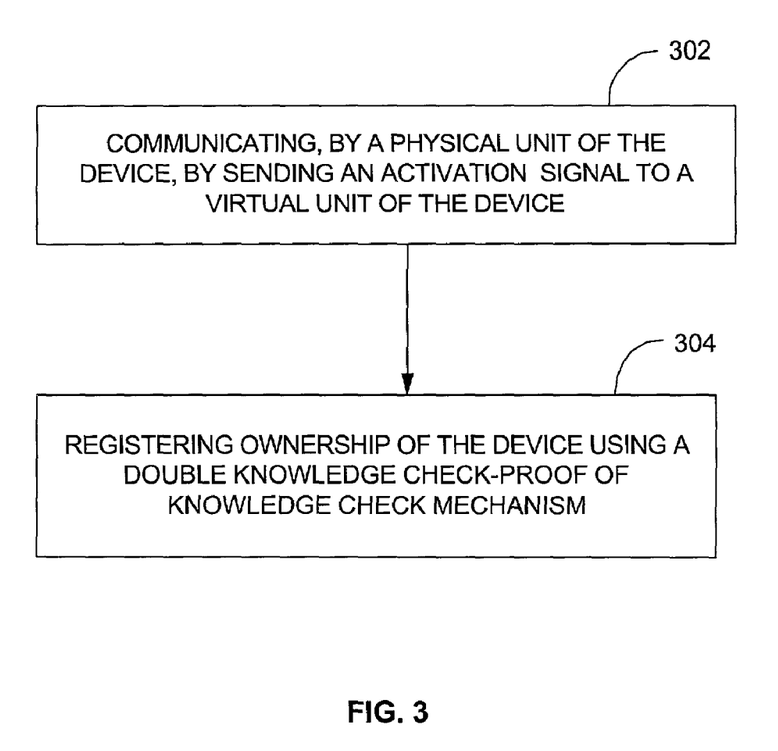
FIG. 3 is a flow chart of another embodiment of steps in accordance with a method of the present invention.

FIG. 3 is a flow chart showing another embodiment of a method in accordance with the present invention. The method provides for taking ownership of a part-physical, part-virtual device by communicating 302, by a physical unit of the device, by sending an activation signal to a virtual unit of the device and then registering 304 ownership of the device using a double knowledge check-proof of knowledge check mechanism. Again, the virtual unit may be a virtual device hosting entity such as, for example, an Internet Data Center, an e-Services Host, a Control Console, or a Secure Data Storage Unit. The Control Console may be, for example, a web browser. Typically, the Secure Data Storage Unit is a memory controllable by the user, wherein the Secure Data Storage Unit may be as described above. In one embodiment, the double knowledge check-proof of knowledge check mechanism may utilize the steps set forth above for the double safety mechanism, but it should be noted that any suitable steps for a double knowledge check-proof of knowledge check mechanism may be used.

Where desired, generating the first Knowledge Element and the first Proof of Knowledge Check Element may be accomplished by the physical unit or a Control Console coupled to the virtual unit, the physical unit and to a Secure Data Storage Unit. Where desired, storing the second Proof of Knowledge Check Element in a second Proof of Knowledge Check Store unit may be accomplished by the physical unit by storing in a memory of the physical unit or by the Control Console by storing in a Secure Data Storage unit. Where desired, an Internet address or uniform resource identifier recorded in the physical unit may be used in the step of activating, by a user, an ownership trigger of the physical unit of the device.

Figure 4:
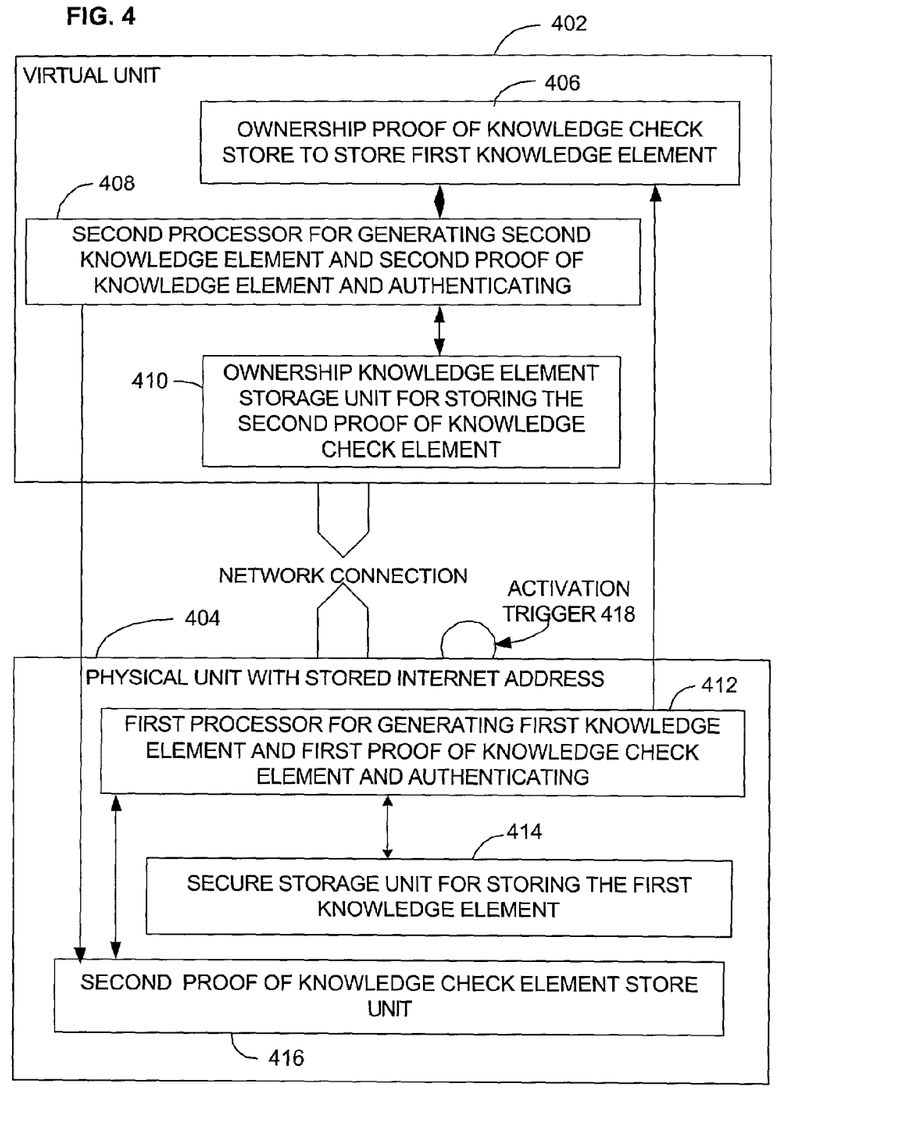
FIG. 4 is a block diagram of one embodiment of a device having a physical unit and a virtual unit in accordance with the present invention.

As shown in FIG. 4, the present invention may be embodied in a two-part device with a physical unit 404 and a virtual unit 402 that interact to initiate, maintain and/or transfer ownership of the two-part device. The physical unit 404 has an ownership activation trigger 418, such as, for example, a button, that a user may use to initiate the activation signal that is sent from the physical unit 404 to the virtual unit 402 to activate an ownership procedure. When the virtual unit 402 is activated (shown in FIG. 4 by using a stored Internet address in the physical unit 404 to the virtual unit 402), the virtual unit 402 communicates with the physical unit 404, and a double safety mechanism is used to register ownership services. Where desired, the virtual unit 402 may be a virtual device hosting entity such as, for example, an Internet Data Center, an e-Services Host, a Control Console, or a Secure Data Storage Unit.

The Control Console may, for example, be a web browser. The Secure Data Storage Unit is generally a memory controllable by the user, such as a physical device under control of the user or a virtual device under control of the user.

Typically, when the virtual unit 402 is activated, the double safety mechanism, may include generation, for example, by a first processor 412 of the physical unit 404, of the first Knowledge Element and the first Proof of Knowledge Check Element. Then, the first Knowledge Element may be stored, for example, in a Secure Storage Unit 414 and the first Proof of Knowledge Check Element may be sent to the virtual unit 402 and stored in an Ownership Proof of Knowledge Check Store 406. Next, the virtual unit 402 generates a second Knowledge Element and a second Proof of Knowledge Check Element, and the second Proof of Knowledge Check Element may be stored in an Ownership Knowledge Element Storage Unit 410. The virtual unit 402 sends the second Proof of Knowledge Check Element to the physical unit 404, which stores the second Proof of Knowledge Check Element in a second Proof of Knowledge Check Store Unit 416. In one embodiment, the physical unit 404 generates the first Knowledge Element and the first Proof of Knowledge Check Element. Alternatively, a Control Console may be coupled to the virtual unit, the physical unit and to the Secure Data Storage Unit, wherein the Control Console generates the first Knowledge Element and the first Proof of Knowledge Check Element. In one embodiment, the physical unit stores the second Proof of Knowledge Check Element in the second Proof of Knowledge Check Store unit that is a memory of the physical unit, but the double check mechanism may be implemented in a vice versa fashion as well.

In FIG. 4, the two-part device's physical unit 404 and virtual unit 402 may be created and linked as part of a manufacturing process. In a preferred embodiment, two knowledge elements and proof of knowledge checks, for example, private key and public key pairs, may be created and separated with the knowledge element of one pair and the proof of knowledge check of the other permanently stored in each of the two parts of the two-part device. Additionally, an Internet address, or alternatively, a uniform resource identifier, which may be dynamically converted to an Internet address, may be assigned to the virtual unit 402 and to the physical unit 404.

Figure 5:
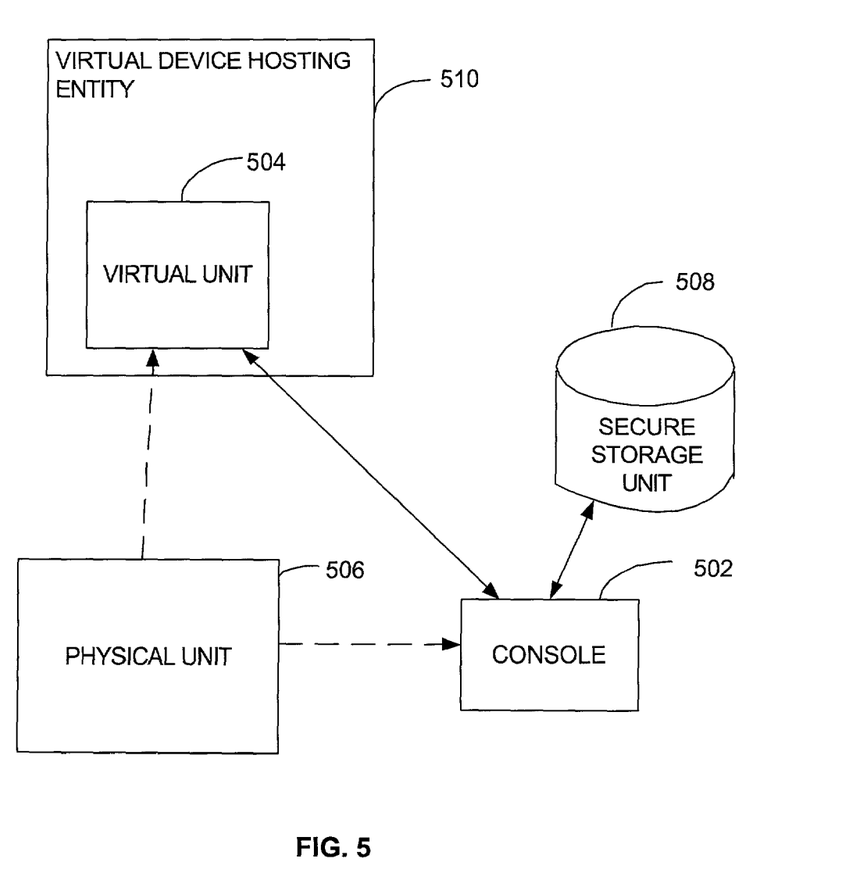
FIG. 5 is a block diagram of another embodiment of a device having a physical unit and a virtual unit in accordance with the present invention.

As shown in FIG. 5, where a Control Console 502 is coupled to the virtual unit, the physical unit 506 and to a Secure Data Storage Unit 508, the Control Console 502 stores the second Proof of Knowledge Check Element in the Ownership Knowledge Element Storage Unit of the Secure Storage Unit 508.

Figure 6:
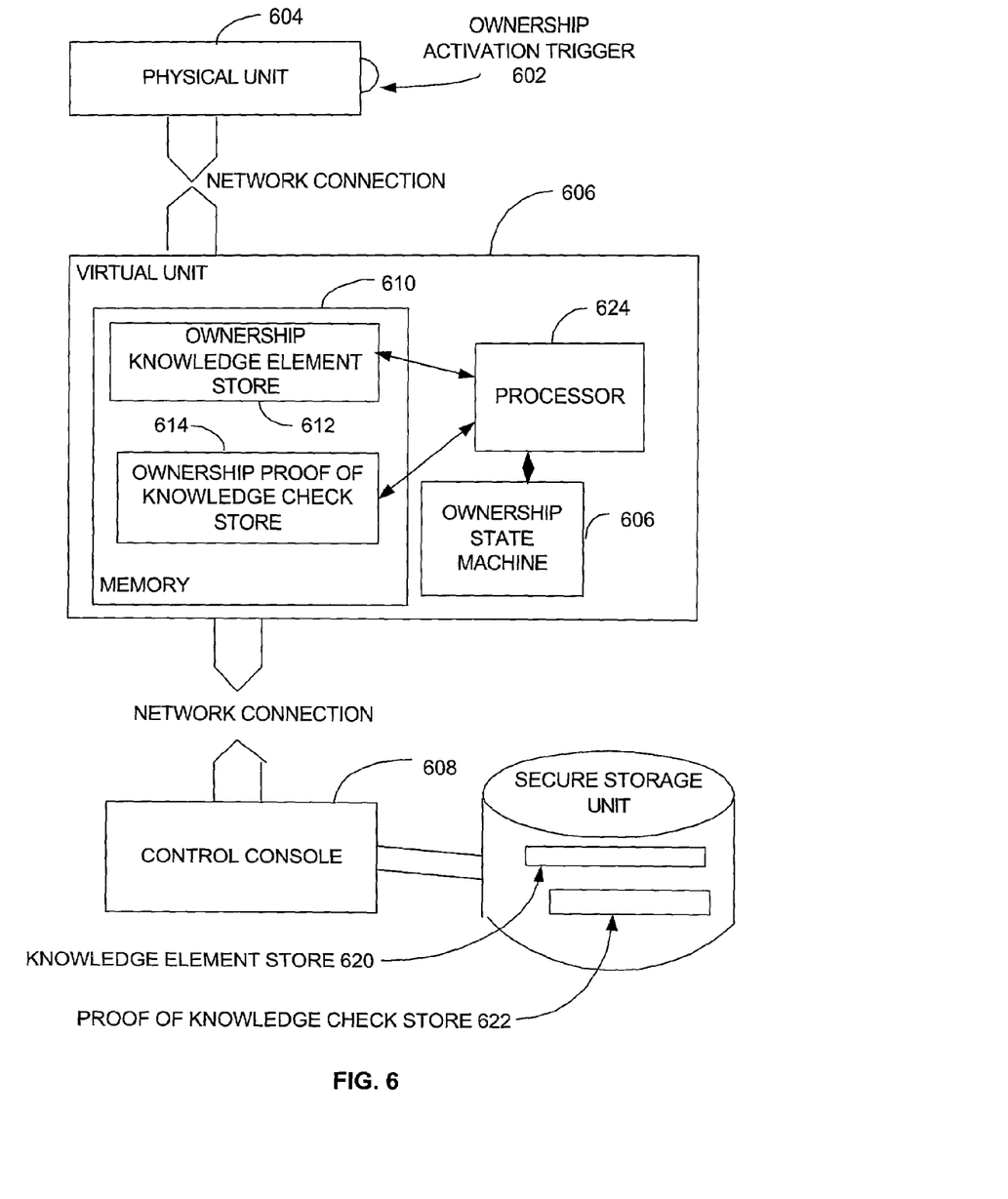

As shown in FIG. 6, the ownership activation trigger 602 of the physical unit 604 may utilize an Internet address or uniform resource identifier recorded in the physical unit 604 to send the activation signal to the virtual unit 606. In the embodiment shown, the virtual unit 606 resides in a Virtual Device Hosting Entity 510. A Control Console 608 may be used to communicate with the virtual unit 606 via an Internet address. In this embodiment memory 610 in the virtual unit 606 is used for an Ownership Knowledge Element Store 612 and an Ownership Proof of Knowledge Check 614. Further, the virtual unit 606 may include an Ownership State Machine 616, coupled to the memory 610, for transitioning between Not Yet Activated, Activated, and Owner states. In the virtual unit 606, a processor 624 is coupled to the Ownership Knowledge Element Store 610, to the Ownership Proof of Knowledge Check Store 614, and to the Ownership State Machine 606, and authenticates the physical unit 604 before changing an ownership state. In the embodiment shown in FIG. 6, the Control Console 608 is also coupled to a Secure Storage Unit 618 that includes a Knowledge Element Store 620 and a Proof of Knowledge Check Store 622. Typically, the Control Console 608 includes a processor (not shown) for implementing authentication using the double check mechanism.

As shown in FIG. 6, the present invention may be implemented as a system for taking ownership of a part-physical, part-virtual device. An activation trigger 602, located on a physical unit 604 of the device, may be used for communicating with a virtual unit 606 by initiating an activation signal, for example, when a user pushes a button that is an activation trigger. The physical unit 604 of the system is coupled to the activation trigger 602 and is used for sending the activation signal initiated by the activation trigger 602 to the virtual unit 606 of the system. The virtual unit 606 of the system is arranged to communicate with the physical unit of the system to allow the physical unit 604 to register ownership of the device using a double knowledge check-proof of knowledge check mechanism. Where desired, the virtual unit 606 may, for example, be a virtual device hosting entity 510 such as is shown in FIG. 5, which could be, for example, an Internet Data Center, an e-Services Host, a Control Console, or a Secure Data Storage Unit. As shown in FIG. 5, the Control Console 502 and/or Secure Storage Unit 508 may be located separately (Control Console 502 shown in FIG. 5) or, if desired, the virtual unit 606 may be a virtual device hosting entity and may include a Control Console and/or a Secure Storage Unit therein. The Control Console may be, for example, a web browser, and the Secure Data Storage Unit is typically a memory controllable by the user such as a physical device under control of the user or a virtual device under control of the user.

The double knowledge check-proof of knowledge check mechanism is typically a mechanism wherein the virtual unit validates the identity of the physical unit using a proof of knowledge check that corresponds to a knowledge element of the physical unit, and the physical unit validates the identity of the virtual unit using a proof of knowledge check that corresponds to a knowledge element of the virtual unit. In one embodiment, ownership may be registered when the physical unit communicates with the virtual unit via an Internet address associated with the virtual unit.

As shown in FIG. 6, the system may include a console 608 that is coupled to the virtual unit 606 via a network connection and to a Secure Storage Unit 618, for maintaining a Knowledge Element Store and a Proof of Knowledge Check Store in the Secure Storage Unit 618. When a first Knowledge Element and a corresponding first Proof of Knowledge Check for the part-physical, part-virtual device are generated, the first Knowledge Element is stored in the Secure Storage Unit 618 and the first Proof of Knowledge Check is sent to the virtual unit 606, typically via the Control Console 608. When the virtual unit 606 receives the first Proof of Knowledge Check and stores the first Proof of Knowledge Check in the Ownership Proof of Knowledge Check Store, the virtual unit 606 then generates a second Knowledge Element and a corresponding second Proof of Knowledge Check, stores the second Knowledge Element in the Ownership Knowledge Element Store and sends the corresponding second Proof of Knowledge Check to the Control Console 608, which stores the corresponding second Proof of Knowledge Check in the Secure Storage Unit 618, whereupon the virtual unit 606 advances the Ownership State Machine 616 to an Owned state. The Ownership State machine 616 may begin in a Not Yet Activated state, transition to an Activated state upon successful completion of the double knowledge check-proof of knowledge check mechanism, and transition to an Owned state when ownership has been established. The Owned state may, for example, allow a full range of predetermined owner services to be accessed using the double knowledge check-proof of knowledge check mechanism. Also, such predetermined owner services may be transferred in the same manner.

Thus, a two-part device with a physical unit and a remote virtual unit, wherein ownership of the two-part device can readily be initiated, maintained, and transferred, has been described according to the present invention. Many modifications and variations may be made to the techniques and structures described and illustrated herein without departing from the spirit and scope of the invention. Accordingly, it should be understood that the method and device described herein are illustrative only and are not limiting upon the scope of the invention.

What is claimed is:

1. A method for securing ownership for a two-part device, wherein ownership of the two-part device is efficiently initiated, maintained, and transferred, comprising the steps of:
   initiating new registration ownership rights of a physical unit and a virtual unit of the two-part device, by a user, with an activation signal from the physical unit to the virtual unit to activate an ownership procedure and configuring registration to allow the physical unit and virtual unit to be operable at different locations; and
   utilizing a double safety mechanism to activate ownership services via the virtual unit for the physical unit.

2. The method of claim 1 wherein the virtual unit is a virtual device hosting entity that is one of: an Internet Data Center, an e-Services Host, a Control Console, and a Secure Data Storage Unit.

3. The method of claim 2 wherein the Control Console is a web browser.

4. The method of claim 2 wherein the Secure Data Storage Unit is a memory controllable by the user.

5. The method of claim 2 wherein the Secure Data Storage Unit is a physical device under control of the user.

6. The method of claim 2 wherein the Secure Data Storage Unit is a virtual device under control of the user.

7. The method of claim 1 wherein the double safety mechanism includes the steps of:
   upon the virtual unit upon being activated, generating a first Knowledge Element and a first Proof of Knowledge Check Element;
   storing the first Knowledge Element in a Secure Storage Unit and sending the Proof of Knowledge Check Element to the virtual unit;
   upon the virtual unit receiving the Proof of Knowledge Check Element, storing, by the virtual unit the first Proof of Knowledge Check Element in an Ownership Proof of Knowledge Check Store and generating, by the virtual unit, a second Knowledge Element and a second Proof of Knowledge Check Element;
   storing, by the virtual unit, the second Knowledge Element in an Ownership Knowledge Element Storage Unit; sending, by the virtual unit, the second Proof of Knowledge Check Element to the physical unit; and storing the second Proof of Knowledge Check Element in a second Proof of Knowledge Check Store unit.

8. The method of claim 7 wherein generating the first Knowledge Element and the first Proof of Knowledge Check Element is accomplished by the physical unit.

9. The method of claim 7 wherein generating the first Knowledge Element and the first Proof of Knowledge Check Element is accomplished by a Control Console coupled to the virtual unit, the physical unit and to a Secure Data Storage Unit.

10. The method of claim 7 wherein storing the second Proof of Knowledge Check Element in a second Proof of Knowledge Check Store unit is accomplished by the physical unit by storing in a memory of the physical unit.

11. The method of claim 7 wherein storing the second Proof of Knowledge Check Element in a second Proof of Knowledge Check Store unit is accomplished by a Control Console by storing in a Secure Data Storage unit.

12. The method of claim 1 wherein initiating, by a user, an activation signal from the physical unit to the virtual unit to activate an ownership procedure includes utilizing an Internet address recorded in the physical unit to send the activation signal.

13. The method of claim 1 wherein initiating, by a user, an activation signal from the physical unit to the virtual unit to activate an ownership procedure includes utilizing a uniform resource identifier recorded in the physical unit to send the activation signal to the virtual unit.

14. A method for taking ownership of a part-physical, part-virtual device, comprising the steps of:
  initiating new registration ownership rights of a physical unit and a virtual unit of the part-physical, part-virtual device:
  communicating, by the physical unit of the device, by sending an activation signal to the virtual unit of the device;
  registering ownership of the device using a double knowledge check-proof of knowledge check mechanism; and
  configuring the registration to allow the part-physical and part-virtual devices to be operable at different locations.

15. The method of claim 14 wherein the virtual unit is a virtual device hosting entity that is one of: an Internet Data Center, an e-Services Host, a Control Console, and a Secure Data Storage Unit.

16. The method of claim 15 wherein the Control Console is a web browser.

17. The method of claim 15 wherein the Secure Data Storage Unit is a memory controllable by the user.

18. The method of claim 15 wherein the Secure Data Storage Unit is a physical device under control of the user.

19. The method of claim 15 wherein the Secure Data Storage Unit is a virtual device under control of the user.

20. The method of claim 14 wherein the double knowledge check-proof of knowledge check mechanism includes the steps of:
  upon the virtual unit upon being activated, generating a first Knowledge Element and a first Proof of Knowledge Check Element;
  storing the first Knowledge Element in a Secure Storage Unit and sending the Proof of Knowledge Check Element to the virtual unit;
  upon the virtual unit receiving the Proof of Knowledge Check Element, storing, by the virtual unit the first Proof of Knowledge Check Element in an Ownership Proof of Knowledge Check Store and generating, by the virtual unit, a second Knowledge Element and a second Proof of Knowledge Check Element;
  storing, by the virtual unit, the second Knowledge Element in an Ownership Knowledge Element Storage Unit;
  sending, by the virtual unit, the second Proof of Knowledge Check Element to the physical unit; and
  storing the second Proof of Knowledge Check Element in a second Proof of Knowledge Check Store unit.

21. The method of claim 20 wherein generating the first Knowledge Element and the first Proof of Knowledge Check Element is accomplished by the physical unit.

22. The method of claim 20 wherein generating the first Knowledge Element and the first Proof of Knowledge Check Element is accomplished by a Control Console coupled to the virtual unit, the physical unit and to a Secure Data Storage Unit.

23. The method of claim 20 wherein storing the second Proof of Knowledge Check Element in a second Proof of Knowledge Check Store unit is accomplished by the physical unit by storing in a memory of the physical unit.

24. The method of claim 20 wherein storing the second Proof of Knowledge Check Element in a second Proof of Knowledge Check Store unit is accomplished by a Control Console by storing in a Secure Data Storage unit.

25. The method of claim 14 wherein activating, by a user, an ownership trigger of a physical unit of the device includes using an Internet address recorded in the physical unit to send the activation signal.

26. The method of claim 14 wherein activating, by a user, an ownership trigger of a physical unit of the device includes utilizing a uniform resource identifier recorded in the physical unit to send the activation signal to the virtual unit.

27. A two-part device with a physical unit and a virtual unit, wherein ownership of the two-part device is efficiently initiated, maintained, and transferred, comprising:
  a physical unit, having an ownership activation trigger for initiating, by a user, an activation signal from the physical unit to the virtual unit to activate an ownership procedure that creates an electronic association before a user takes possession; and
  the virtual unit, which communicates with the physical unit upon activation;
  wherein the physical unit and the virtual unit employ a double safety mechanism to register ownership services and wherein ownership registration allows the physical unit and the virtual unit to be operable at different locations.

28. The device of claim 27 wherein the virtual unit is a virtual device hosting entity that is one of: an Internet Data Center, an e-Services Host, a Control Console, and a Secure Data Storage Unit.

29. The device of claim 28 wherein the Control Console is a web browser.

30. The device of claim 28 wherein the Secure Data Storage Unit is a memory controllable by the user.

31. The device of claim 28 wherein the Secure Data Storage Unit is a physical device under control of the user.

32. The device of claim 28 wherein the Secure Data Storage Unit is a virtual device under control of the user.

33. The device of claim 27 wherein the virtual unit is activated and in the double safety mechanism, a first processor in the physical unit generates a first Knowledge Element and a first Proof of Knowledge Check Element, stores the first Knowledge Element in a Secure Storage Unit and sends the Proof of Knowledge Check Element to the virtual unit, which authenticates and stores the Proof of Knowledge Check Element in an Ownership Proof of Knowledge Check Store and a second processor in the virtual unit generates a second Knowledge Element and a second Proof of Knowledge Check Element, wherein the second Proof of Knowledge Check Element is stored in an Ownership Knowledge Element Storage Unit; and the virtual unit sends the second Proof of Knowledge Check Element to the physical unit, which authenticates and stores the second Proof of Knowledge Check Element in a second Proof of Knowledge Check Store unit.

34. The device of claim 33 wherein the physical unit generates the first Knowledge Element and the first Proof of Knowledge Check Element.

35. The device of claim 33 further including a Control Console coupled to the virtual unit, the physical unit and to the Secure Data Storage Unit, wherein the Control Console generates the first Knowledge Element and the first Proof of Knowledge Check Element.

36. The device of claim 33 wherein the physical unit stores the second Proof of Knowledge Check Element in the second Proof of Knowledge Check Store unit that is a memory of the physical unit.

37. The device of claim 33 further including a Control Console coupled to the virtual unit, the physical unit and to a Secure Data Storage Unit, wherein the Control Console stores the second Proof of Knowledge Check Element in the Ownership Knowledge Element Storage Unit.

38. The device of claim 27 wherein the ownership activation trigger utilizes an Internet address recorded in the physical unit to send the activation signal.

39. The device of claim 27 wherein the ownership activation trigger utilizes a uniform resource identifier recorded in the physical unit to send the activation signal to the virtual unit.

40. A system for taking ownership of a part-physical, part-virtual device, comprising:
an activation trigger, located on a physical unit of the device, for initiating an activation signal and new registration ownership rights of the physical unit of and the virtual unit of the part-physical, part-virtual device; and
the physical unit of the system, coupled to the activation trigger, for sending the activation signal to a virtual unit of the system; and
the virtual unit of the system, arranged to communicate with the physical unit of the system, for registering ownership of the device using a double knowledge check-proof of knowledge check mechanism and for configuring registration to allow the part-physical and part-virtual devices to be operable at different locations.

41. The system of claim 40 wherein the virtual unit is a virtual device hosting entity that is one of: an Internet Data Center, an e-Services Host, a Control Console, and a Secure Data Storage Unit.

42. The system of claim 41 wherein the Control Console is a web browser.

43. The system of claim 41 wherein the Secure Data Storage Unit is a memory controllable by the user.

44. The system of claim 41 wherein the Secure Data Storage Unit is a physical device under control of the user.

45. The system of claim 41 wherein the Secure Data Storage Unit is a virtual device under control of the user.

46. The system of claim 40 wherein the double knowledge check-proof of knowledge check mechanism is a mechanism wherein the virtual unit validates the identity of the physical unit using a proof of knowledge check that corresponds to a knowledge element of the physical unit and the physical unit validates the identity of the virtual unit using a proof of knowledge check that corresponds to a knowledge element of the virtual unit.

47. The system of claim 40 wherein ownership is registered when the physical unit communicates with the virtual unit via an Internet address associated with the virtual unit.

48. The system of claim 47 wherein the virtual unit includes a first storage location for an Ownership Knowledge Element Store, coupled to store a knowledge element for the virtual unit, a second storage location for an Ownership Proof of Knowledge Check Store, coupled to receive an Ownership Proof of Knowledge Check from the physical unit, and an Ownership State Machine, coupled to the Ownership Knowledge Element Store and the Ownership Proof of Knowledge Check Store, for beginning in a Not Yet Activated state, transitioning to an Activated state upon successful completion of the double knowledge check-proof of knowledge check mechanism, and transitioning to an Owned state when ownership has been established.

49. The system of claim 48 further including a console, coupled to the virtual unit via a network connection and to a Secure Storage Unit, for maintaining a Knowledge Element Store and a Proof of Knowledge Check Store in the Secure Storage Unit and, upon user selection, for generating a first Knowledge Element and a corresponding first Proof of Knowledge Check for the part-physical, part-virtual device, storing the first Knowledge Element in the Secure Storage Unit and sending the first Proof of Knowledge Check to the virtual unit.

50. The system of claim 49 wherein the virtual unit, upon receiving the first Proof of Knowledge Check, stores the first Proof of Knowledge Check in the Ownership Proof of Knowledge Check Store and generates a second Knowledge Element and a corresponding second Proof of Knowledge Check, stores the second Knowledge Element in the Ownership Knowledge Element Store and sends the corresponding second Proof of Knowledge Check to the console, which stores the corresponding second Proof of Knowledge Check in the Secure Storage, whereupon the virtual unit advances the Ownership State Machine to an Owned state.

51. The system of claim 50 wherein the Owned state allows a full range of predetermined owner services to be accessed using the double knowledge check-proof of knowledge check mechanism.

52. The system of claim 51 wherein the Owned state allows a full range of predetermined owner services to be transferred using the double knowledge check-proof of knowledge check mechanism.

* * * * *